Dec. 26, 1950     D. KLINGMAN     2,535,581
ADJUSTABLE DRILLING JIG
Filed Aug. 2, 1946     2 Sheets-Sheet 1
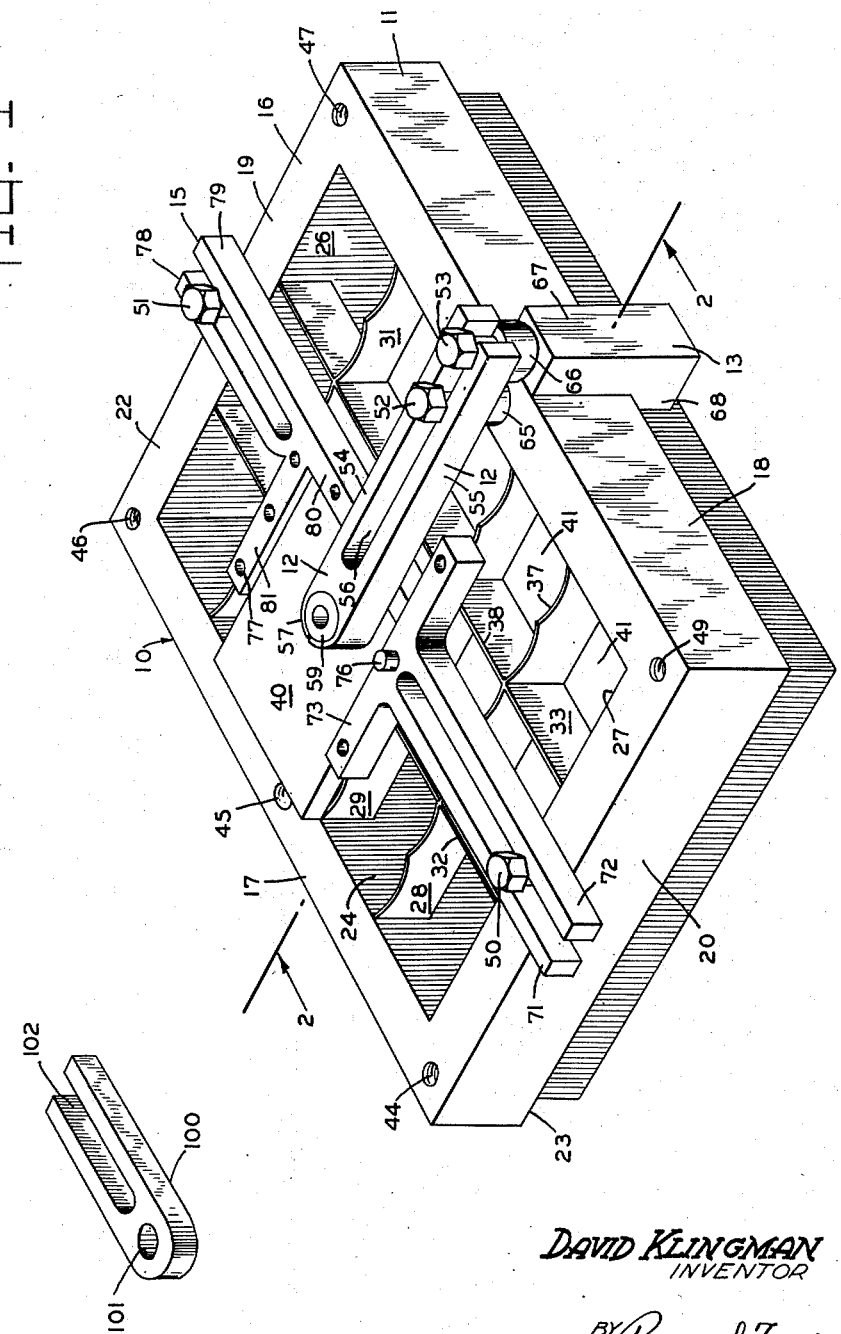
DAVID KLINGMAN
INVENTOR
BY Richard S. Temko
ATTORNEY Dec. 26, 1950          D. KLINGMAN          2,535,581
ADJUSTABLE DRILLING JIG
Filed Aug. 2, 1946          2 Sheets-Sheet 2
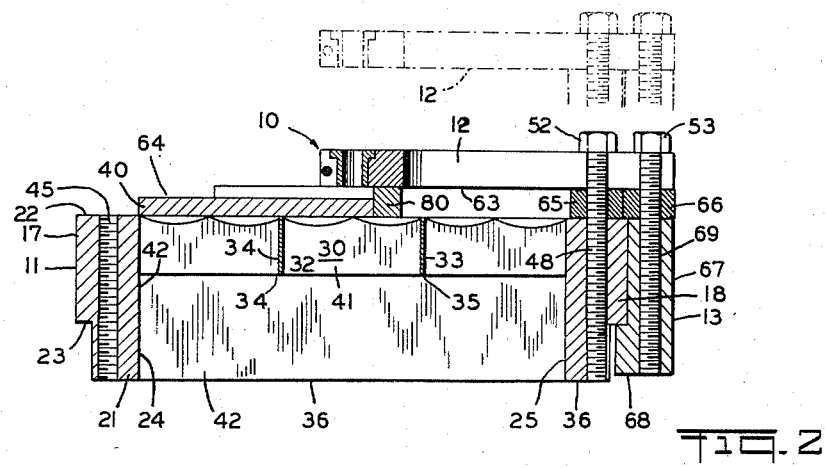
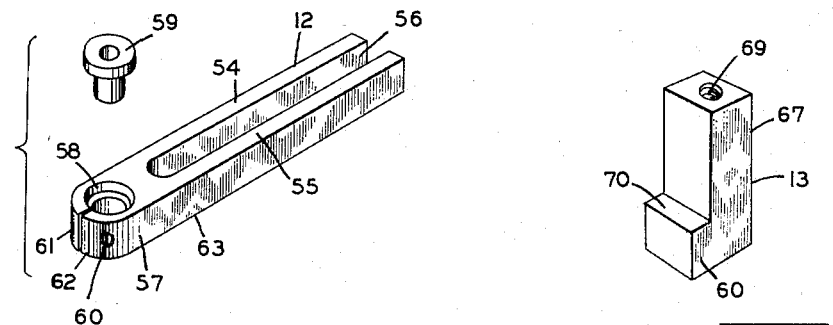
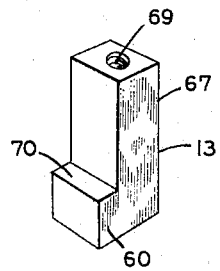
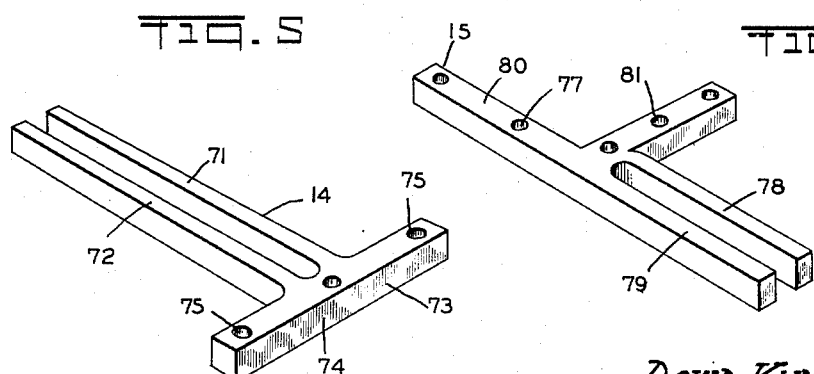
David Klingman
INVENTOR
BY Richard S. Temko
ATTORNEY Patented Dec. 26, 1950

2,535,581

UNITED STATES PATENT OFFICE 2,535,581

ADJUSTABLE DRILLING JIG

David Klingman, Brooklyn, N. Y.

Application August 2, 1946, Serial No. 687,930

5 Claims. (Cl. 77—62)

This invention relates generally to clamping devices and more particularly to the improved drilling jig construction which is versatile and highly useful in operation.

In drilling a workpiece or performing similar operations thereon it is well-known that the accuracy of the work is increased when the drill or other tool is supported close to the workpiece in a relatively rigid manner. Where a very large number of finished pieces is required, jigs and fixtures of a permanent nature are frequently constructed. Where a smaller number of finished pieces is desired, the cost in time and material may not allow the construction of such jigs and fixtures from an economic point of view. As a result of this, the workman may resort to makeshifts which, in view of the low accuracy of the parts produced, are of little worth.

It is therefore among the principal objects of the present invention to provide a novel and useful adjustable drilling jig which may be quickly and conveniently altered in arrangement so as to accommodate various workpieces of different sizes and shapes.

Another object lies in the provision of a device of the class described which provides a support for the tool close to the workpiece.

Another object herein lies in the provision of an adjustable jig having orifices for the passage of chips and shavings.

A feature of the present invention resides in the fact that support for the drill or other tool may be arranged with respect to the workpiece and with respect to the base element so that the cutting tool may freely penetrate the workpiece without having its cutting edges damaged by contact with the base element.

Another object herein lies in the provision of structure of the class described, utilizing a minimum of machined parts so that said device may be manufactured in large scale at low cost to have consequent wide distribution and use.

A feature of the invention lies in the fact that the jig need not be lifted to discharge chips but need only be laterally slid until a portion of the central opening of the base element overhangs the table on the drill press whereby shavings and chips will be discharged into a suitable container or the floor.

These objects and other incidental ends and advantages will more fully appear in the progress of this disclosure and be pointed out in the appended claims.

In the drawings in which similar reference characters designate corresponding parts throughout the several views:

Figure 1 is a view in perspective of an embodiment of the invention.

Figure 2 is a vertical sectional view as seen generally from the plane 2—2 and Figure 1.

Figure 3 is an exploded view showing the drill guide element and drill bushing.

Figure 3A is a perspective view of an alternate form of spacer element.

Figure 4 is a view in perspective of the main lower clamp element.

Figure 5 is a view in perspective of a first work positioning element, or work piece clamp.

Figure 6 is a view in perspective of a second work positioning element, or work piece guide.

In accordance with the invention the adjustable drilling jig 10 comprises broadly a base element 11, a drill guide element 12, a main lower clamp element 13, a first work positioning element 14, and a second work positioning element 15.

The base element 11 includes a frame member 16. The frame member 16 is preferably rectangular in shape and for the purpose of facilitating the description may include front and rear portions 17 and 18 and side portions 19 and 20. Projecting downwardly from the frame member 16, and spaced inwardly from the outer vertical surfaces of said frame member is an annular frame support member 21. The frame member 16 has a top surface 22 which is preferably smooth and a bottom surface 23, also preferably smooth. The surfaces 22 and 23 are preferably parallel with respect to each other. Bridging between the inner vertical wall surfaces 24 and 25, and 26 and 27 are a plurality of work support members 28, 29, 30 and 31, and 32 and 33, respectively. The lower surfaces or edges 34 and 35 of the work support members 28—33 are disposed a substantial distance above the lower edge 36 of the frame support member 21. The upper edges 37 of the members 28—31 undulate while the upper edges of the members 32 and 33 may be relatively straight. This shape and arrangement of the edges 37 and 38 permit a workpiece such as the workpiece 40 to be shifted about so that while supported adequately against drill bit pressure clearance may be had for the drill bit to extend through the workpiece.

The criss-cross arrangement of the work support members 28—33 provides a plurality of passages generally indicated by reference character 41 through which chips and shavings may readily pass under the action of gravity.

While I have shown the frame member 16 as being rectangular it may have any other suitable general shape as, for example, round, oval or polygonal.

The frame member 16 is provided with a plurality of threaded holes 44—49 inclusive, not all of which are specifically illustrated in the drawings, particularly the threaded holes which contain the bolts 50 and 51. The holes last mentioned serve to position the parts, as will more fully appear, to meet particular drilling arrangements and while I have placed 8 holes in the frame member 16, this number may be altered, depending upon the range of adjustment desired.

The drill guide element 12 is best seen in Figures 1, 2 and 3, and includes a pair of legs 54 and 55 which are spaced and parallel, having the indentation 56 therebetween. The inner surfaces of the legs 54 and 55 are spaced a distance sufficient to allow passage therebetween of the bolts 52 and 53. The front end 57 of the guide element 12 has an opening 58 adapted to receive a drill bushing 59, the internal diameter of which is correlative to the drill bit (not shown) which may extend through the same during the drilling operation. A set screw 60 serves to draw the two forward juxtaposed portions 61 and 62 of the front end 57 together to detachably clamp the drill bushing 59 in place. The under surface 63 of the element 12 is preferably placed as close to the top surface 64 of the workpiece 40 as possible or convenient, and for this purpose spacers 65 and 66 are used. The spacers 65 and 66 are in the shape of collars or washers whose bores are at least equal to the diameter of the bolts 52 and 53. The spacers 65 and 66 may therefore be varied in length (vertical direction as viewed in Figure 2) to accommodate the height of the workpiece 40. As a matter of convenience, a supply of spacers 65 and 66 of varying lengths in pairs may be kept for use with the device 10. The bolt 52 may penetrate any of the holes 44—49, and in other arrangements, even those holes which, as placed in Figure 1, are penetrated by the bolts 50 and 51.

The bolt 53 threadedly engages the main lower clamping element 13. The clamping element 13 is of generally L-shape, including a vertical portion 67 and a horizontal portion 68. The portion 68 is adapted to be drawn up snug against the surface 23 when the bolt 53 is tightened by penetrating the threaded hole 69. This construction provides for the rotation of the element 12 about the bolt 52 as a pivot and of clamping said element 12 in an adjusted rotated position. Thus the element 12 may be varied from its position of perpendicularity with respect to the rear portion 18 (as shown) to other adjusted positions where it may be relatively rigidly maintained by the tightening of the screws 52 and 53. Since the effective clamping pressure upon the base 11 occurs against the upper and lower surfaces 22 and 23, only these surfaces are desirably smoothed as by machining. The uppermost portions of the upper edges of the members 28—33 inclusive are preferably coplanar with the surface 22. The surface 36 is preferably smooth so that the base 11 may have a firm footing upon the drill press table. Since only the outer edge portion of the surface 23 is engaged by the upper surface 70 of the horizontal portion 68, only such portion need be smoothed for desired engagement of the parts.

The first work clamping element 14 has legs 71 and 72 which are preferably substantially identical with the legs 54 and 55 so that they may be penetrated by the screw 50 for maintaining said element 14 in fixed position. The screw bolt 50 is selectively engageable with any of the remaining unoccupied threaded orifices in the frame 16. The front portion 73 of the element 14 is preferably perpendicular with respect to the rear legs thereof and has a smooth surface 74. The front portion 73 is provided with a plurality of spaced orifices 75 capable of receiving the shank of a headed pin 76. The pin 76 is also engageable with any one of the orifices 77 in the second work positioning element 15. By adjusting the elements 14 or 15 and the pin 76, a guided or keyed arrangement may be made for drilling a series of equidistantly spaced holes in an elongated workpiece (not shown).

The element 15 has a pair of legs 78 and 79 which are similar to the legs 71 and 72, although preferably shorter. The forward portion 80 is aligned with the leg 79 while the side portion 81 is at right angles to the portion 80. The element 15 is clamped in position by the screw 51 which may be shifted about the frame 16 in a manner similar to the screw 50 or the screw 52, that is, occupying any unoccupied hole.

Since the bolts 50 and 51 penetrate the indentations between the legs of the members 14 and 15, said members may be shifted longitudinally with respect to said indentations or rotated about the screws 50 and 51 as centers. It thus is possible to maneuver the elements 14 and 15, and the element 12 so as to position the workpiece 40 (or another workpiece with a wide range of sizes and shapes within the capacity of the device 10) whereby it may be drilled or otherwise machined through the guide 12 at a variety of locations.

Where special rigidity is required and the legs 71—72 or 78—79 overhang the frame member 16 additional clamp elements like 13, and bolts like 53 may be used. Where space permits, more than one guide like 12 may be used simultaneously.

In Figure 3A a spacer element 100 is shown, which may be substituted for the spacers 65 and 66. The screw 52 passes through the hole 101 and the screw 53 through the open ended slot 102.

It may thus be seen that I have disclosed a novel and useful drilling jig construction which is simple in manufacture and operation, highly versatile, accurate, and low in cost.

I wish it to be understood that I do not desire to be limited to the exact details of construction shown and described, for obvious modifications will occur to a person skilled in the art.

I claim:

1. An adjustable drill jig, comprising: a tool guide, a base having an annular frame member defining a relatively large opening between opposite inner surfaces of said frame member means associating said guide with said base; a plurality of work support members extending between opposite portions of said frame member forming passages; and a frame support member lying below said frame member and having a lower edge; said work support members having lower edges which are disposed above the lower edge of the frame support member; whereby said drill may penetrate the passages between the work support members so that shavings and debris produced by the drill may pass laterally beneath the work support members.

2. An adjustable drill jig, comprising: a base having an annular frame member with first and second surfaces; a drill guide element having an opening in one portion thereof adapted to be penetrated by said drill; first means slidably and pivotally connecting said drill guide element to the first surface of said frame member; and second means engaging the second surface of the frame member and said drill guide element.

3. An adjustable drill jig, comprising: a base having an annular frame member with first and second surfaces; a drill guide element having an opening in one portion thereof adapted to be penetrated by said drill; first means slidably and pivotally connecting said drill guide element to the first surface of said frame member; and second means engaging the second surface of the frame member and said drill guide element, said second means including an L-shaped clamp member.

4. An adjustable drill jig, comprising: a base having an annular frame member with first and second surfaces, said first and second surfaces being spaced and substantially parallel; a drill guide element having an opening in one portion thereof adapted to be penetrated by said drill; first means slidably and pivotally connecting said drill guide element to the first surface of said frame member; and second means engaging the second surface of the frame member and said drill guide element.

5. An adjustable drilling jig comprising: a drill guide, a base having an annular frame member, means associating said guided with said frame member, a work positioning element having an elongated opening therein; means penetrating said opening for clamping said positioning element to said frame member; said work positioning element including a front portion; said front portion having a plurality of holes; a pin selectively engageable with said holes; said pin predetermining a plurality of positions at which the tool guide may be secured.

DAVID KLINGMAN.

REFERENCES CITED

The following references are of record in the file of this patent:

UNITED STATES PATENTS

| Number | Name | Date |
|---|---|---|
| 111,084 | Reaney | Jan. 17, 1871 |
| 1,017,846 | Budlong | Feb. 20, 1912 |
| 1,060,574 | Anderson | May 6, 1913 |
| 2,148,156 | Hogapian | Feb. 21, 1939 |
| 2,401,054 | Daley | May 28, 1946 |
| 2,407,769 | Anderson | Sept. 17, 1946 |